US011220191B2

(12) United States Patent
Kinomura

(10) Patent No.: US 11,220,191 B2
(45) Date of Patent: Jan. 11, 2022

(54) VEHICLE CHARGING SYSTEM, VEHICLE, AND AUTHENTICATION METHOD FOR VEHICLE CHARGING SYSTEM

(71) Applicant: TOYOTA JIDOSHA KABUSHIKI KAISHA, Toyota (JP)

(72) Inventor: Shigeki Kinomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 16/381,260

(22) Filed: Apr. 11, 2019

(65) Prior Publication Data

US 2019/0315245 A1    Oct. 17, 2019

(30) Foreign Application Priority Data

Apr. 13, 2018    (JP) .............................. JP2018-077428

(51) Int. Cl.
| | |
|---|---|
| *B60L 53/66* | (2019.01) |
| *H04W 12/06* | (2021.01) |
| *B60L 53/12* | (2019.01) |
| *B60L 53/30* | (2019.01) |
| *H04W 12/0431* | (2021.01) |
| *B60K 35/00* | (2006.01) |
| *B60R 11/04* | (2006.01) |

(52) U.S. Cl.
CPC ............. *B60L 53/66* (2019.02); *B60L 53/12* (2019.02); *B60L 53/305* (2019.02); *H04W 12/0431* (2021.01); *H04W 12/06* (2013.01); *B60K 35/00* (2013.01); *B60R 11/04* (2013.01); *B60Y 2300/91* (2013.01)

(58) Field of Classification Search
CPC ........ B60L 53/66; B60L 53/305; B60L 53/31; H02J 50/80; H02J 7/00034; H02J 7/0027; Y02T 90/12; Y02T 90/16; Y02T 90/14; Y04S 30/14; Y04S 40/126; B60R 11/04
See application file for complete search history.

(56) References Cited

U.S. PATENT DOCUMENTS 6,703,925 B2 *    3/2004    Steffel ..................... B60R 25/25
340/425.5
9,162,581 B2 *    10/2015    Ichikawa ................ B60L 53/36
(Continued)

FOREIGN PATENT DOCUMENTS

| DE | 10 2013 217 623 A1 | 4/2014 |
|---|---|---|
| DE | 10 2013 222 092 A1 | 4/2015 |

(Continued)

*Primary Examiner* — Helen Rossoshek
(74) *Attorney, Agent, or Firm* — Sughrue Mion, PLLC

(57) ABSTRACT

Charging equipment of a vehicle charging system comprises an information indicator configured to indicate authentication information, and an authentication device configured to perform authentication using the authentication information. A vehicle of the vehicle charging system comprises an imaging device, and a communication device configured to send the authentication information acquired by the imaging device to the authentication device. The authentication device of the charging equipment is configured to perform the authentication using the authentication information received from the communication device, and is configured to, if the authentication has succeeded, permit the vehicle to use a wireless LAN.

8 Claims, 8 Drawing Sheets

(56) References Cited

U.S. PATENT DOCUMENTS

| | | | |
|---|---|---|---|
| 9,197,093 B2* | 11/2015 | Sagata | B60L 53/65 |
| 9,290,104 B2* | 3/2016 | Gadh | B60L 11/1838 |
| 9,381,878 B2* | 7/2016 | Ichikawa | B60R 16/03 |
| 9,393,877 B2* | 7/2016 | Gunter | B60L 53/65 |
| 9,436,944 B2* | 9/2016 | Turner | G06Q 20/40 |
| 10,021,354 B2* | 7/2018 | Haas | G06Q 20/14 |
| 10,391,872 B2* | 8/2019 | Gaither | B60L 53/57 |
| 10,612,262 B2* | 4/2020 | Katanoda | E04H 6/42 |
| 10,661,661 B2* | 5/2020 | Misawa | B60L 53/66 |
| 10,850,634 B2* | 12/2020 | Wang | B60L 53/39 |
| 2010/0292877 A1* | 11/2010 | Lee | B60L 53/80 701/21 |
| 2012/0217764 A1* | 8/2012 | Ishiguro | E05B 81/78 296/1.07 |
| 2013/0127409 A1 | 5/2013 | Ichikawa | |
| 2013/0193749 A1 | 8/2013 | Nakamura et al. | |
| 2013/0311247 A1* | 11/2013 | Wass | G06Q 20/3278 705/13 |
| 2014/0074352 A1 | 3/2014 | Tate, Jr. et al. | |
| 2015/0008877 A1 | 1/2015 | Ichikawa et al. | |
| 2015/0221139 A1* | 8/2015 | Bogaard | G06Q 20/102 705/13 |
| 2015/0224888 A1* | 8/2015 | Wild | B60L 11/1824 705/26.9 |
| 2015/0226572 A1* | 8/2015 | North | B60L 53/66 701/400 |
| 2016/0050208 A1* | 2/2016 | Arasavelli | H04L 63/10 726/29 |
| 2016/0297316 A1* | 10/2016 | Penilla | G06Q 30/0259 |
| 2017/0004712 A1* | 1/2017 | Yang | H04L 67/025 |
| 2017/0146354 A1* | 5/2017 | Boss | G07C 5/0866 |
| 2017/0225802 A1* | 8/2017 | Lussier | E04H 12/003 |
| 2017/0243418 A1 | 8/2017 | Outwater et al. | |
| 2017/0318921 A1* | 11/2017 | Gharabegian | H04N 7/181 |
| 2017/0320400 A1* | 11/2017 | Redmann | B60L 11/1848 |
| 2018/0012433 A1* | 1/2018 | Ricci | B60R 1/00 |
| 2018/0215280 A1* | 8/2018 | Lee | B60R 25/257 |
| 2018/0272886 A1* | 9/2018 | Stocker | B60L 53/14 |
| 2019/0054835 A1* | 2/2019 | Liang | B60L 11/1846 |
| 2019/0230323 A1* | 7/2019 | Koravadi | H04N 5/232 |
| 2019/0299878 A1* | 10/2019 | Nishio | B60R 11/04 |
| 2019/0311241 A1* | 10/2019 | Friedman | G06N 5/04 |
| 2019/0315240 A1* | 10/2019 | Wu | H02J 50/10 |
| 2019/0333037 A1* | 10/2019 | Rayner | G06Q 20/3276 |
| 2020/0198492 A1* | 6/2020 | Muramatsu | H02J 3/003 |
| 2020/0350775 A1* | 11/2020 | Penilla | G06Q 30/0643 |
| 2021/0031947 A1* | 2/2021 | Wankewycz | B64D 47/08 |

FOREIGN PATENT DOCUMENTS

| | | | | |
|---|---|---|---|---|
| JP | 2013-97796 A | * | 5/2013 | G06K 7/00 |
| JP | 2013-110822 A | | 6/2013 | |
| JP | 2013-126327 A | | 6/2013 | |
| JP | 2013-146148 A | | 7/2013 | |
| JP | 2013-146154 A | | 7/2013 | |
| JP | 2013-154815 A | | 8/2013 | |
| JP | 2014-154092 A | | 8/2014 | |
| JP | 2015-050719 A | | 3/2015 | |
| JP | 2017-41939 A | * | 9/2015 | D04B 1/106 |
| JP | 2015-232199 A | | 12/2015 | |
| JP | 2017-127124 A | | 7/2017 | |
| WO | 2012/108156 A1 | | 8/2012 | |
| WO | WO-2017041939 A1 | * | 3/2017 | B60T 7/22 |

\* cited by examiner

VEHICLE CHARGING SYSTEM, VEHICLE, AND AUTHENTICATION METHOD FOR VEHICLE CHARGING SYSTEM

This nonprovisional application is based on Japanese Patent Application No. 2018-077428 filed on Apr. 13, 2018 with the Japan Patent Office, the entire contents of which are hereby incorporated by reference.

BACKGROUND

Field

The present disclosure relates to a vehicle charging system, a vehicle, and an authentication method for a vehicle charging system.

Description of the Background Art

WO 2012/108156 discloses a vehicle charging system in which electric power is supplied from charging equipment to a vehicle. In this vehicle charging system, charging equipment is provided with an IC card reader to read authentication information from an IC card. The charging equipment uses authentication information read by the IC card reader to perform authentication as to whether to permit access to a wireless LAN base station. Successful authentication permits wireless communication between the wireless LAN base station installed in the charging equipment and a user's terminal (e.g. notebook computer) and makes the wireless LAN (local area network) of the charging equipment available for use. Japanese Patent Laying-Open Nos. 2013-154815, 2013-146154, 2013-146148, 2013-110822, and 2013-126327 also disclose techniques related to wireless power transmission.

SUMMARY

In the vehicle charging system described in WO 2012/108156, in order for a user to use the wireless LAN of the charging equipment, the user has to bring the IC card close to the IC card reader so that the IC card reader can read the authentication information on the IC card. Such an action required every time is troublesome for the user and reduces the user convenience.

The present disclosure has been made to solve the above-described problem. An object of the present disclosure is to reduce the user's work load for authentication and improve the user convenience in a vehicle charging system.

A vehicle charging system of the present disclosure includes a vehicle, and charging equipment configured to perform supply of electric power from the charging equipment to the vehicle. The charging equipment comprises an information indicator configured to indicate authentication information, and an authentication device configured to perform authentication using the authentication information. The vehicle comprises an imaging device and a sending device. The sending device is configured to send the authentication information acquired by the imaging device to the authentication device. The authentication device is configured to perform the authentication using the authentication information received from the sending device, and is configured to, if the authentication has succeeded, permit the vehicle to use a prescribed service.

In the above-described vehicle charging system, authentication information to be used for authentication is acquired by the imaging device of the vehicle, and the acquired authentication information is sent to the authentication device of the charging equipment by the sending device of the vehicle. If authentication information is successfully acquired by the imaging device of the vehicle, the authentication information is automatically sent to the authentication device without requiring the user to input the authentication information. Thus, according to the above-described vehicle charging system, the user's work load for authentication (in particular, the user's trouble of inputting authentication information) can be reduced, and user convenience can be improved.

In the above-described vehicle charging system, the charging equipment may include a first communication device configured to perform wireless communication, and a power transmission device configured to wirelessly supply electric power. The vehicle may include a second communication device configured to perform wireless communication, and a power reception device configured to wirelessly receive electric power. In response to the authentication succeeding, wireless communication between the first communication device and the second communication device may be permitted as the prescribed service.

In general, in a wireless charging system in which power transfer is wirelessly performed between charging equipment and a vehicle, communication is also wirelessly (i.e., contactlessly) performed. According to the above-described configuration of the vehicle charging system of the present disclosure, authentication of such communication can be smoothly performed.

The information indicator may be provided at the power transmission device. In general, power transfer from the power transmission device of the charging equipment to the power reception device of the vehicle is performed with the power transmission device and the power reception device facing each other. If the information indicator indicating authentication information is provided at the power transmission device, the imaging device of the vehicle can image the authentication information when the vehicle is approaching the power transmission device. Thus, according to the above-described configuration, the authentication information can be smoothly acquired.

The wireless communication to be permitted in response to the authentication succeeding may be wireless communication using a wireless LAN. The authentication information may include an SSID (service set identifier) and an encryption key for connection to the wireless LAN. The authentication information may be indicated in the form of a two-dimensional code. Such a configuration can achieve an excellent authentication system using existing techniques (e.g. WiFi [registered trademark] and QR Code [registered trademark]). The SSID is an identifier allocated to a wireless LAN access point. The encryption key is information for encrypting communication so as to prevent the communication on the wireless LAN from being intercepted.

In the above-described vehicle charging system, the supply of electric power from the charging equipment to the vehicle may be performed when the vehicle is parked in a prescribed region of the charging equipment. The information indicator may be provided in the prescribed region. The imaging device included in the vehicle may include a front camera configured to image the frontward field of the vehicle, and a back camera configured to image the backward field of the vehicle. The front camera may be configured to acquire the authentication information when the vehicle parks forward in the prescribed region; and the back camera may be configured to acquire the authentication information when the vehicle parks backward in the prescribed region.

According to the above-described configuration, authentication information can be smoothly acquired both when the vehicle parks forward in the charging position (i.e., in the prescribed region) and when the vehicle parks backward in the charging position.

The imaging device may be configured to be usable for drive assist of the vehicle. Since the authentication information is acquired using the imaging device that is also used for another purpose in the vehicle, there is no need to separately provide an imaging device for acquiring authentication information. In particular, the imaging device used for the drive assist of the vehicle can image the surroundings of the vehicle at a sufficient resolution and is thus suitable for acquiring the authentication information.

The vehicle may further include a decryption device configured to decrypt the authentication information using a key inputted beforehand when the authentication information is encrypted. With the vehicle including such a decryption device, once a key is inputted to the decryption device of the vehicle, the authentication information is automatically decrypted afterward without requiring the user to input the key when decryption of authentication information is necessary. Thus, the user does not have to input the key every time decryption of authentication information is necessary.

A vehicle of the present disclosure includes a power storage device configured to be charged with electric power supplied from charging equipment. The vehicle comprises the power storage device, an imaging device, a recognizing device, and a sending device. The recognizing device is configured to recognize authentication information included in information acquired by the imaging device. The sending device is configured to send the authentication information recognized by the recognizing device to the charging equipment.

In such a vehicle, the recognizing device recognizes the authentication information included in the information acquired by the imaging device. The authentication information to be recognized is information that identifies charging equipment (e.g. the information indicated on the charging equipment). The authentication information recognized by the recognizing device is sent to the charging equipment by the sending device. If authentication information is successfully acquired by the imaging device of the vehicle, the authentication information is automatically sent to the charging equipment without requiring the user to input the authentication information. Thus, according to the above-described vehicle, the user's work load for authentication can be reduced, and user convenience can be improved.

The above-described vehicle may further comprise a decryption device configured to decrypt the authentication information using a key inputted beforehand when the authentication information is encrypted. With the vehicle including such a decryption device, once a key is inputted to the decryption device of the vehicle, the authentication information is automatically decrypted afterward without requiring the user to input the key when decryption of authentication information is necessary. Thus, the user does not have to input the key every time decryption of authentication information is necessary.

An authentication method for a vehicle charging system of the present disclosure comprises the following processes A to G. Process A is determining, by a vehicle, whether or not authentication information is included in information acquired by an imaging device. Process B is, if it is determined that the authentication information is included in the information acquired by the imaging device, determining, by the vehicle, whether or not the authentication information is encrypted. Process C is, if it is determined that the authentication information is encrypted, determining, by the vehicle, whether or not a key for decrypting the encrypted authentication information has been inputted beforehand. Process D is, if it is determined that the key has been inputted beforehand, decrypting the encrypted authentication information using the key inputted beforehand, and sending the decrypted authentication information to charging equipment, by the vehicle. Process E is, if it is determined that the key has not been inputted beforehand, requesting a user to input the key, decrypting the encrypted authentication information using the key inputted by the user, and sending the decrypted authentication information to the charging equipment, by the vehicle. Process F is, if it is determined that the authentication information is unencrypted, sending, by the vehicle, the unencrypted authentication information to the charging equipment. Process G is, if it is determined that the authentication information is not included in the information acquired by the imaging device and a prescribed condition is satisfied, requesting a user to input the authentication information, and sending the authentication information inputted by the user to the charging equipment, by the vehicle.

Automating the acquisition, decryption, and sending of authentication information in the vehicle can reduce the user's work load for authentication (in particular, the user's trouble of inputting authentication information). However, some kind of obstacle (e.g. foreign body) may prevent the imaging device of the vehicle from acquiring authentication information. Accordingly, in the above-described authentication method, if it is determined that authentication information is not included in the information acquired by the imaging device of the vehicle and a prescribed condition is satisfied, then the user is requested to input authentication information. According to the above-described authentication method, during a normal time (i.e., when the imaging device can acquire authentication information), acquisition of authentication information is automated to reduce the user's work load; whereas, when a prescribed condition is satisfied (e.g. when the imaging device cannot acquire authentication information), the above-described automation can be stopped and the user can be requested to input (manually input) authentication information.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
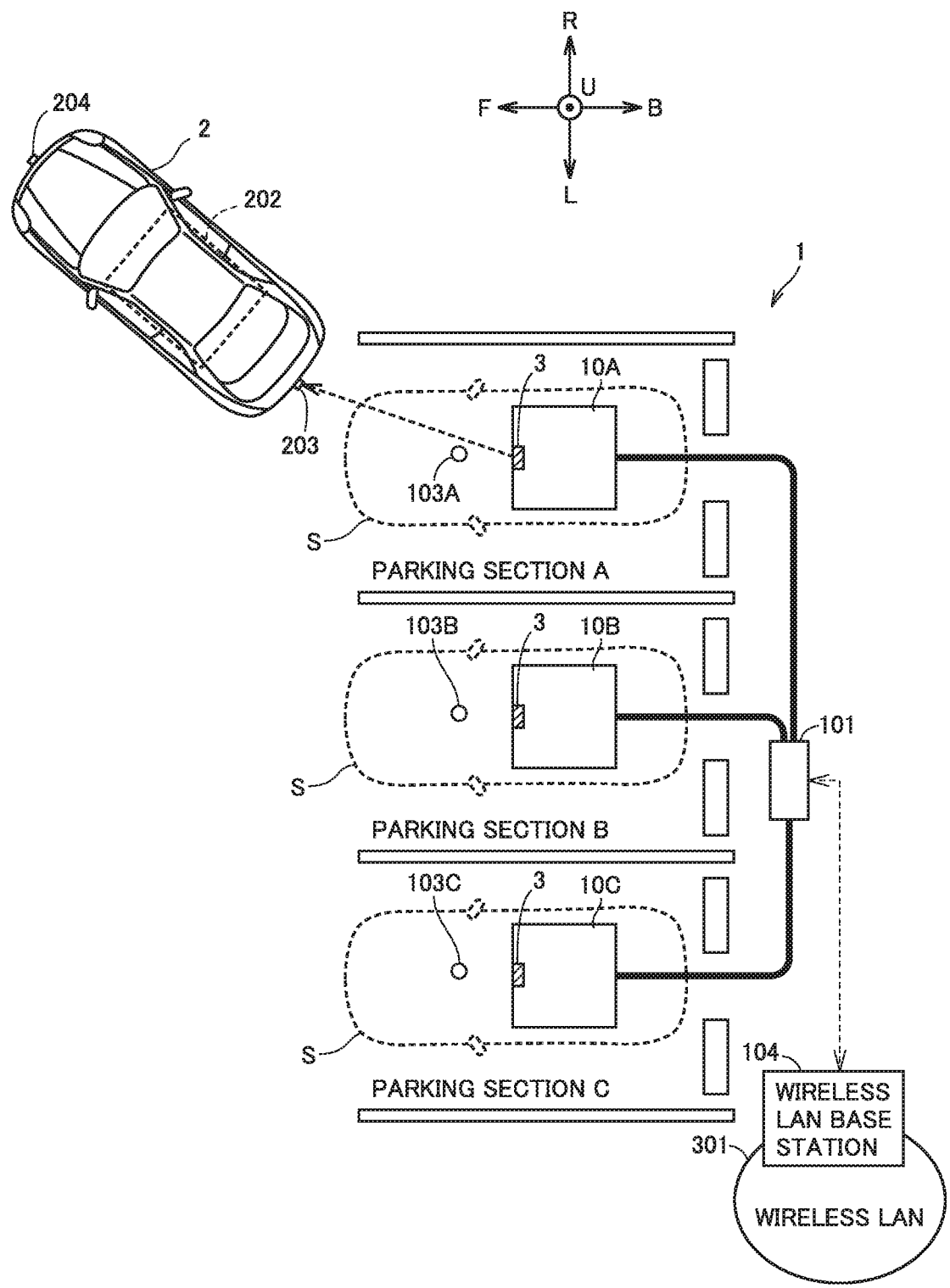
FIG. 1 is a general configuration diagram of a vehicle charging system in an embodiment of the present disclosure.

An embodiment of the present disclosure will now be described in detail with reference to the accompanying drawings, in which the same or corresponding components are designated by the same reference characters, and description thereof will not be repeated.

Arrows F, B, R, L, U, D in the drawings hereinafter used denote directions relative to the vehicle. Arrow F denotes "front", arrow B denotes "back", arrow R denotes "right", arrow L denotes "left", arrow U denotes "up", and arrow D denotes "down". The electronic control unit is hereinafter referred to as an "ECU".

FIG. 1 is a general configuration diagram of a vehicle charging system in the present embodiment. With reference to FIG. 1, the vehicle charging system in the present embodiment includes a charging station 1 and a vehicle 2. In this vehicle charging system, supply of electric power from charging station 1 to vehicle 2 is performed. Supply of electric power from charging station 1 to vehicle 2 is performed by a wireless system with no cable (wireless power feeding system). That is, power transfer between charging station 1 and vehicle 2 is performed wirelessly. Electric power supplied from charging station 1 to vehicle 2 charges a power storage device 202 of vehicle 2. Charging station 1 in the present embodiment corresponds to an example of "charging equipment" in the present disclosure.

Charging station 1 includes parking sections A to C and a control unit 101. Parking sections A to C respectively include power transmission units 10A to 10C and vehicle detection sensors 103A to 103C. Control unit 101 is configured to control each of power transmission units 10A to 10C. Each of vehicle detection sensors 103A to 103C detects the presence or absence of vehicle 2, and outputs a signal representing the presence or absence of vehicle 2 to control unit 101. Each of vehicle detection sensors 103A to 103C is, for example, a proximity sensor. Control unit 101 can detect the presence or absence of vehicle 2 in parking sections A to C based on the outputs from vehicle detection sensors 103A to 103C. Each of parking sections A to C in the present embodiment corresponds to an example of "a prescribed region of charging equipment" in the present disclosure.

Parking space S in each of parking sections A to C shows the parking position of vehicle 2 at the time of charging (in particular, a region where vehicle 2 can lie at the time of charging). When vehicle 2 is parked in parking space S, electric power can be supplied from charging station 1 to vehicle 2. FIG. 1 shows a case in which vehicle 2 enters parking section A to be parked in parking space S backward. However, vehicle 2 may be parked forward in a parking section (any one of parking sections A to C). In the present embodiment, charging station 1 is configured so that vehicle 2 can be parked both backward and forward in the parking sections. When there is no other vehicle (a vehicle other than vehicle 2) in parking sections A to C (i.e., parking sections A to C are vacant), vehicle 2 may be parked in any one of parking sections A to C. The number of parking sections is not limited to three but may be changed as desired Power transmission units 10A to 10C are disposed in parking spaces S of parking sections A to C, respectively. Each of power transmission units 10A to 10C includes an information indicator 3 to indicate authentication information, the details of which will be described later. In the present embodiment, power transmission units 10A to 10C have identical information indicators 3. However, if the charging equipment is provided with a plurality of wireless LAN access points (e.g. if different wireless LAN access points are used depending on which of power transmission units 10A to 10C is used for charging), different information indicators may be provided for different wireless LAN access points.

Charging station 1 further includes a wireless LAN base station 104. Wireless LAN base station 104 serves as an access point of a wireless LAN 301. In the present embodiment, wireless LAN 301 is a wireless LAN in conformity with IEEE802.11 (e.g. WiFi [registered trademark]). Control unit 101 and wireless LAN base station 104 are configured to exchange information with each other via wireless communication. In the present embodiment, a single wireless LAN base station 104 (a common wireless LAN base station) is provided for a plurality of power transmission units 10A to 10C. However, this is not a limitation, and a wireless LAN base station may be provided for each power transmission unit.

Vehicle 2 includes power storage device 202. Vehicle 2 may be an electric vehicle configured to travel using only electric power stored in power storage device 202, or may be a hybrid vehicle configured to travel using both electric power stored in power storage device 202 and output from an engine (not shown).

Vehicle 2 further includes a back camera 203 provided on the back face of vehicle 2, and a front camera 204 provided on the front face of vehicle 2. Back camera 203 is configured to image the back of vehicle 2. Front camera 204 is configured to image the front of vehicle 2. Each of back camera 203 and front camera 204 is an imaging device used for drive assist of vehicle 2, such as parking assist or collision avoidance. Each of back camera 203 and front camera 204 includes, for example, a complementary metal oxide semiconductor (CMOS) image sensor and/or a charge-coupled device (CCD) image sensor. Each of back camera 203 and front camera 204 in the present embodiment corresponds to an example of an "imaging device" in the present disclosure.

Hereinafter, each of power transmission units 10A to 10C is referred to as a "power transmission unit 10", and each of vehicle detection sensors 103A to 103C is referred to as a "vehicle detection sensor 103" when there is no need to distinguish between A to C (when the common configuration, characteristics, or the like are described).

Figure 2:
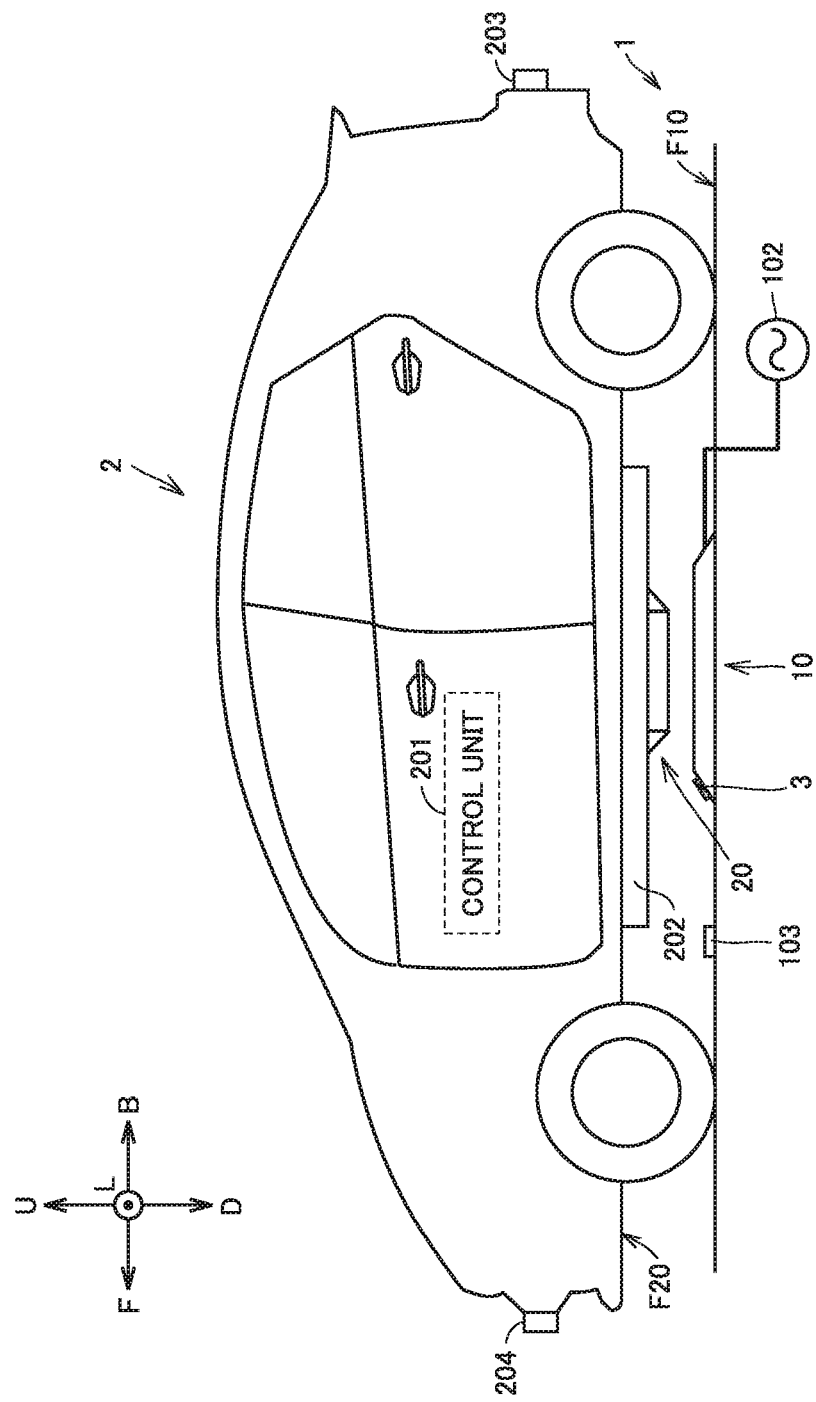
FIG. 2 shows a vehicle as seen from the left when electric power is supplied in the vehicle charging system shown in FIG. 1.

FIG. 2 shows vehicle 2 as seen from the left when electric power is supplied. With reference to FIG. 2, charging station 1 further includes an AC power supply 102 (e.g. a commercial grid power supply) to supply electric power to each power transmission unit 10. Power transmission unit 10 and vehicle detection sensor 103 are each installed on the ground F10, and AC power supply 102 is installed in the ground. Vehicle 2 further includes a power reception unit 20 and a control unit 201 to control power reception unit 20.

Power reception unit 20 is provided on the lower face (the road-facing side) of power storage device 202 installed on the bottom face F20 of vehicle 2. Power transmission unit 10 is configured to wirelessly transmit power to power reception unit 20 of vehicle 2 via a magnetic field when vehicle 2 is positioned so that power reception unit 20 faces power transmission unit 10. Power reception unit 20 wirelessly receives electric power from power transmission unit 10. Control unit 201 controls power reception unit 20 to charge power storage device 202 with electric power received by power reception unit 20.

Parking space S in FIG. 1 shows the region where vehicle 2 can lie when vehicle 2 is parked so that the relative positional relationship between power transmission unit 10 of charging station 1 and power reception unit 20 of vehicle 2 is a prescribed positional relationship in which wireless charging can be performed. With the increase in displacement of power reception unit 20 from the position where power reception unit 20 can most efficiently receive electric power from power transmission unit 10 (hereinafter referred to as a "reference power reception position"), the power receiving efficiency (the proportion of the reception power to the transmission power) tends to decrease. If the amount of displacement of power reception unit 20 from the reference power reception position is larger than a prescribed value (or if the power receiving efficiency is lower than a prescribed value), it is determined that wireless power transfer between power transmission unit 10 and power reception unit 20 (and thus, wireless charging of power storage device 202) cannot be performed. Power transmission unit 10 and power reception unit 20 in the present embodiment respectively correspond to an example of a "power transmission device" and a "power reception device" in the present disclosure.

Figure 3:
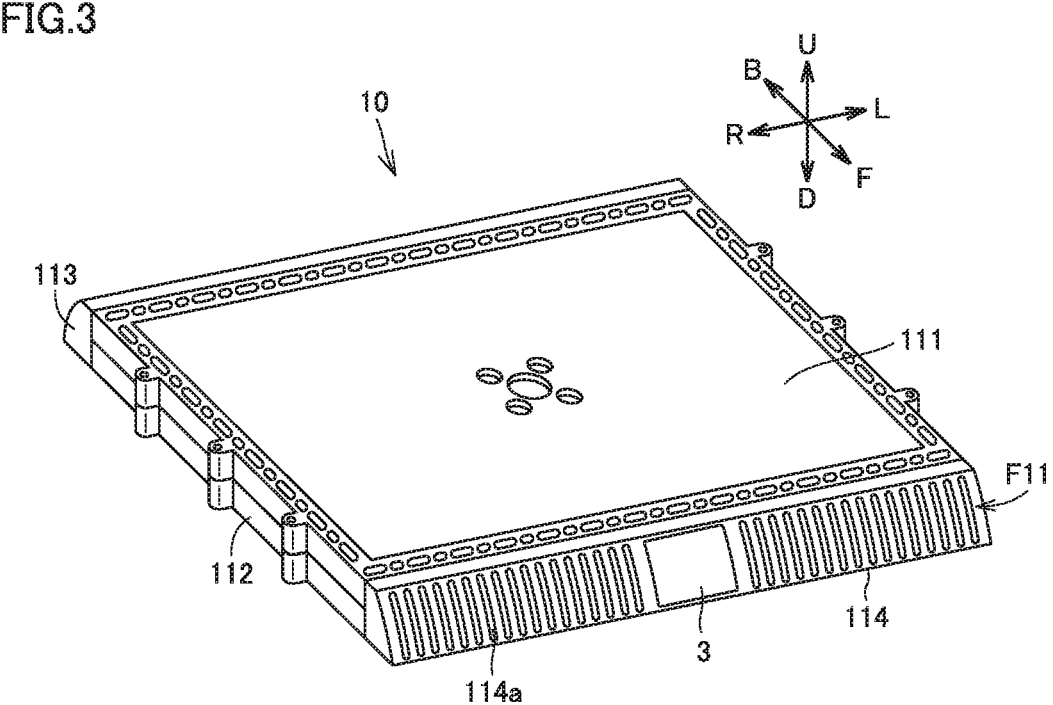
FIG. 3 shows an external appearance of the power transmission unit shown in FIG. 2.

FIG. 3 shows an external appearance of power transmission unit 10. With reference to FIG. 3, power transmission unit 10 has a casing containing a coil, a ferrite plate (the core of the coil), a metallic plate for electromagnetic shielding, a circuit board, and the like (none of them is shown).

The casing of power transmission unit 10 includes an upper cover 111, an under cover 112, and side covers 113, 114. Upper cover 111 and side covers 113, 114 are made of, for example, a resin. Under cover 112 is made of, for example, a metal such as aluminum or aluminum alloy.

Under cover 112 has heat radiator fins (not shown) at both ends in the front-back direction (F-B direction), and each heat radiator fin is covered with side covers 113 and 114. Each of side covers 113 and 114 has a plurality of slits so that side covers 113 and 114 will not prevent radiation of heat from the heat radiator fins. For example, an inclined face F11 of side cover 114 has a plurality of slits 114a.

Inclined face F11 of side cover 114 further includes information indicator 3. Information indicator 3 is a part that displays authentication information. For example, information indicator 3 comprises a label that includes authentication information. In the present embodiment, information indicator 3 (label) is attached to the casing (in particular, inclined face F11) of power transmission unit 10. Authentication information is indicated on the label in the form of a matrix two-dimensional code, such as QR Code (registered trademark). As the authentication information, the present embodiment employs an SSID and an encryption key for connection to wireless LAN 301 (FIG. 1). Any encryption scheme may be used for the encryption key. Examples of the encryption scheme for the encryption key include Wired Equivalent Privacy (WEP), Wi-Fi Protected Access (WPA) (registered trademark), WPA2, and WPA3.

Information indicator 3 is not limited to the above-described label, but may be, for example, a flat panel display (FPD). That is, authentication information may be indicated on information indicator 3 (FPD) installed on a surface (e.g. inclined face F11) of power transmission unit 10. Examples of the FPD include a liquid crystal display, an organic EL, and an electronic paper.

The indication form of authentication information is not limited to the two-dimensional code, but may be any form. For example, authentication information may be indicated in the form of any one of a one-dimensional code (e.g. a bar code), a character string, a digit string, and a color code.

Figure 4:
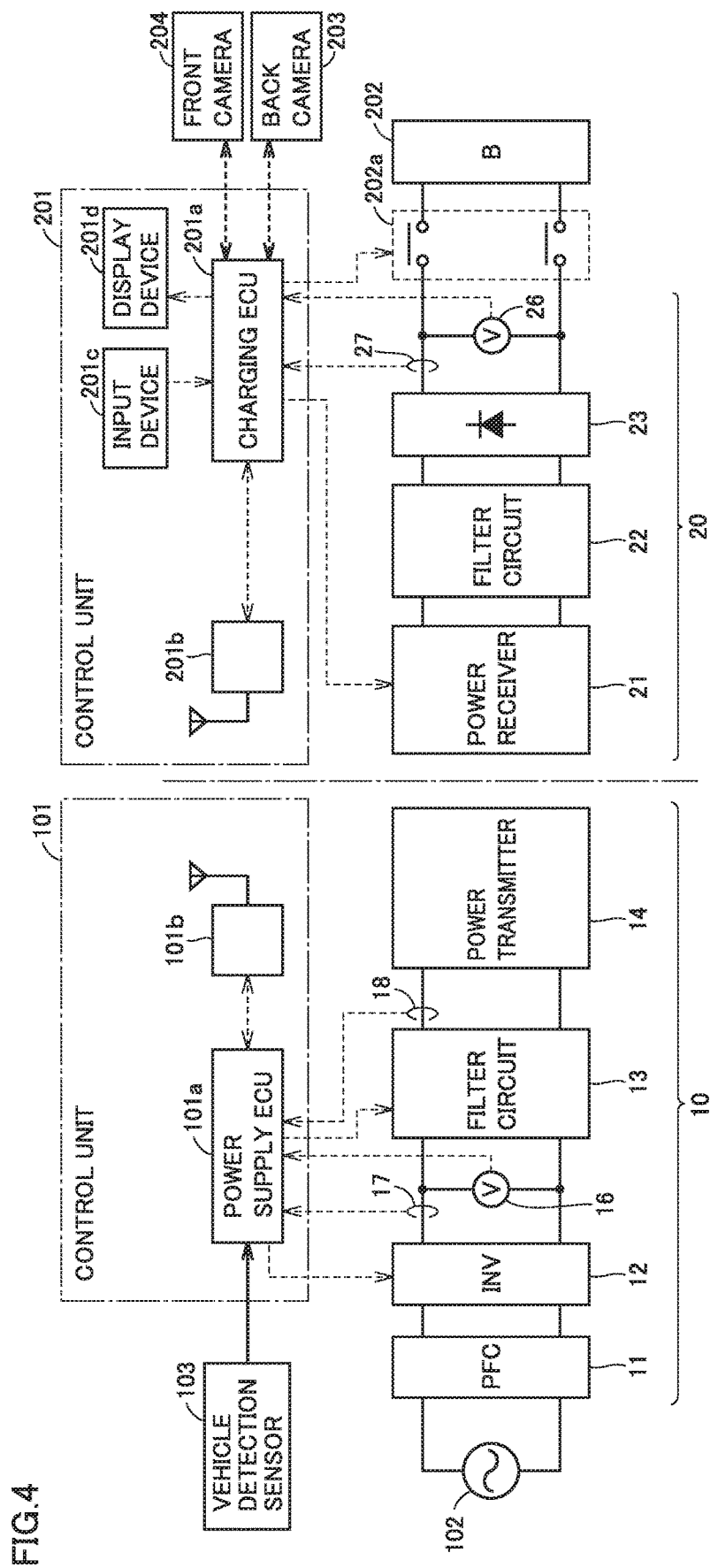
FIG. 4 shows a configuration for performing wireless power transfer between the charging equipment and a vehicle in the vehicle charging system shown in FIG. 1.

FIG. 4 shows a configuration for performing wireless power transfer between charging station 1 and vehicle 2.

With reference to FIG. 4, power transmission unit 10 includes a power factor correction circuit (hereinafter referred to as a "PFC circuit") 11, an inverter 12, a filter circuit 13, a power transmitter 14, a voltage sensor 16, and current sensors 17, 18.

PFC circuit 11 is configured to rectify power received from AC power supply 102, raise its voltage, and supply the power to inverter 12. PFC circuit 11 is also configured to bring the input current close to a sinusoidal wave to correct the power factor. Inverter 12 is configured to convert DC power received from PFC circuit 11 into transmission power (AC power) having a prescribed transmission frequency (e.g. several tens of kHz). Inverter 12 comprises, for example, a single-phase full bridge circuit. Filter circuit 13 is configured to suppress harmonic noise generated from inverter 12. Filter circuit 13 comprises an LC filter including, for example, an inductor and a capacitor Power transmitter 14 receives AC power having a transmission frequency from inverter 12 through filter circuit 13, and wirelessly transmits power to a power receiver 21 via an electromagnetic field generated around power transmitter 14. Power transmitter 14 includes a resonance circuit for wirelessly transmitting power to power receiver 21, for example. The resonance circuit comprises, for example, a coil and a capacitor, and is designed to resonate in a transmission frequency. The Q value indicating the resonance strength of the resonance circuit is preferably 100 or more.

Voltage sensor 16 detects the output voltage of inverter 12, and outputs the detection value to a power supply ECU 101a. Current sensor 17 detects the output current of inverter 12, and outputs the detection value to power supply ECU 101a. Current sensor 18 detects the current flowing through power transmitter 14, and outputs the detection value to power supply ECU 101a. The transmission power supplied from inverter 12 to power transmitter 14 (i.e., electric power outputted from power transmitter 14 to power receiver 21) can be detected based on the detection values from voltage sensor 16 and current sensors 17, 18.

Control unit 101 includes power supply ECU 101a and a communication device 101b. Power supply ECU 101a includes a central processing unit (CPU) as an arithmetic device, a storage device, and an input-output buffer (none of them is shown). The storage device includes a random access memory (RAM) as a working memory and storage (e.g. a read only memory [ROM] and a rewritable nonvolatile memory). Power supply ECU 101a receives signals from various types of sensors and controls various types of devices in power transmission unit 10. Various types of control may be performed by software processing, or may be performed by dedicated hardware (an electric circuit).

Communication device 101b is configured to perform wireless communication with wireless LAN base station 104 shown in FIG. 1. An SSID and an encryption key for connection to wireless LAN 301 are set for communication device 101b, so that access from communication device 101b to wireless LAN base station 104 can be permitted. Thus, communication device 101b is connectable to wireless LAN 301 via wireless LAN base station 104 (an access point of wireless LAN 301). Communication device 101b in the present embodiment corresponds to an example of a "first communication device" in the present disclosure.

Power reception unit 20 includes power receiver 21, a filter circuit 22, a rectifying device 23, a voltage sensor 26, and a current sensor 27. A charging relay 202a is provided between power storage device 202 (onboard battery) and power reception unit 20 mounted on vehicle 2 (FIG. 1).

Power receiver 21 wirelessly receives power (AC power) outputted from power transmitter 14. Power receiver 21 includes a resonance circuit for wirelessly receiving power from power transmitter 14, for example. The resonance circuit comprises a coil and a capacitor, and is designed to resonate in a transmission frequency. The Q value of the resonance circuit is preferably 100 or more.

Filter circuit 22 is provided between power receiver 21 and rectifying device 23 to suppress harmonic noise generated during power reception. Filter circuit 22 comprises an LC filter including, for example, an inductor and a capacitor. Rectifying device 23 rectifies AC power received by power receiver 21 and outputs the rectified power (DC power) to power storage device 202 through charging relay 202a. Rectifying device 23 includes a rectifier (such as a diode), a switching element, and a smoothing capacitor, for example.

Charging relay 202a is controlled to be on and off by charging ECU 201a. When wireless charging of power storage device 202 is to be executed by power transmission unit 10, charging relay 202a is turned on (closed) so that power transfer between power receiver 21 and power storage device 202 is ready. Voltage sensor 26 detects the output voltage (receiving voltage) of rectifying device 23, and outputs the detection value to charging ECU 201a. Current sensor 27 detects the output current (receiving current) of rectifying device 23, and outputs the detection value to charging ECU 201a.

Power storage device 202 is a rechargeable DC power supply. Power storage device 202 includes a secondary battery, such as a lithium-ion battery or a nickel-hydrogen battery. Power storage device 202 stores electric power outputted from rectifying device 23, and supplies electric power to a not-shown vehicle drive (e.g. an inverter and a drive motor).

Control unit 201 includes charging ECU 201a, a communication device 201b, an input device 201c, and a display device 201d.

Charging ECU 201a includes a CPU as an arithmetic device, a storage device, and an input-output buffer (none of them is shown). The storage device includes a RAM as a working memory and storage (e.g. a ROM and a rewritable nonvolatile memory). Charging ECU 201a receives signals from various types of sensors including the above-described back camera 203 and front camera 204, and controls various types of devices in power reception unit 20. Various types of control may be performed by software processing, or may be performed by dedicated hardware (an electric circuit).

Communication device 201b may serve as a slave unit of wireless LAN base station 104 (master unit) shown in FIG. 1. Communication device 201b is connectable to wireless LAN 301 when authentication in charging station 1 shown in FIG. 1 succeeds, the details of which will be described later. In response to the authentication succeeding, access from communication device 201b to wireless LAN base station 104 is permitted, and communication device 201b is connectable to wireless LAN 301 via wireless LAN base station 104 (an access point of wireless LAN 301). Communication device 201b in the present embodiment corresponds to an example of a "sending device" and a "second communication device" in the present disclosure. In the present embodiment, the "sending device" and the "second communication device" are embodied in a single communication device 201b (a common communication device). However, the "sending device" and the "second communication device" may be embodied in separate communication devices.

Input device 201c is a device to receive instructions from the user. Input device 201c is operated by the user and outputs a signal corresponding to the user's operation to charging ECU 201a. The communication between charging ECU 201a and input device 201c may be either wire or wireless communication. Input device 201c is installed at a position such that the user on the driver's seat (not shown) of vehicle 2 can operate input device 201c, for example. Input device 201c may be, but is not limited to, a touch panel. Input device 201c may also be a keyboard, a mouse, or various types of switches such as a pushbutton switch or a lever. Input device 201c may be the operation unit of an onboard car navigation system.

Display device 201d is a device to display information and signals inputted from charging ECU 201a. The communication between charging ECU 201a and display device 201d may be either wire or wireless communication. Display device 201d is installed at a position such that the user on the driver's seat (not shown) of vehicle 2 can see display device 201d, for example. Display device 201d may be various types of displays, such as a liquid crystal display or a touch panel. Display device 201d may be the display screen of a meter panel, or may be the display screen of an onboard car navigation system. Display device 201d may also have a speaker function.

Figure 5:
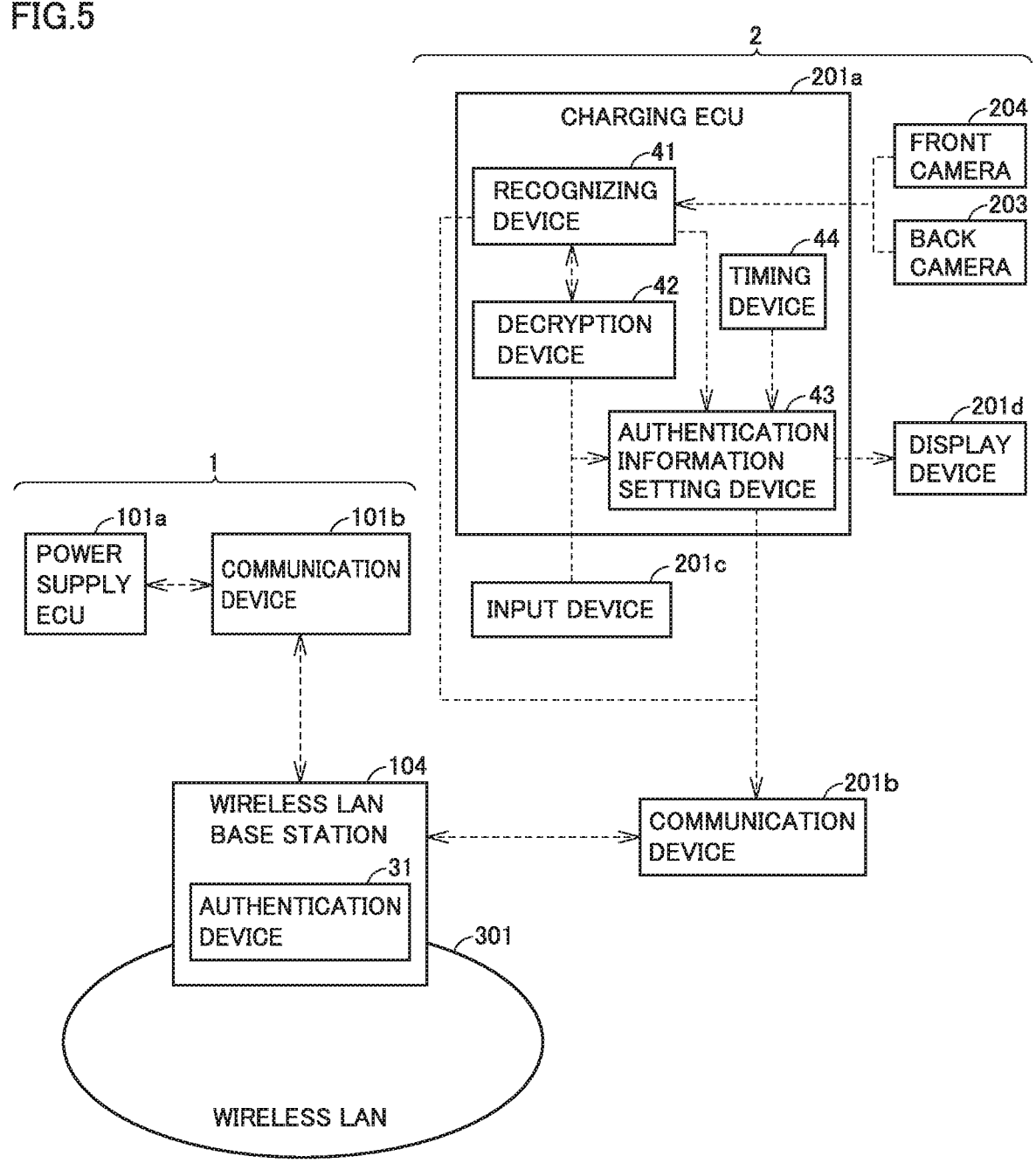
FIG. 5 shows a configuration for performing authentication as to whether to permit a vehicle to use the service provided by the charging equipment in the vehicle charging system shown in FIG. 1.

FIG. 5 shows a configuration for performing authentication as to whether to permit vehicle 2 to use the service provided by charging station 1 (in the present embodiment, wireless LAN 301 provided by charging station 1). In the present embodiment, wireless communication between communication device 101b and communication device 201b (i.e., use of wireless LAN 301) is permitted in response to the authentication succeeding.

With reference to FIG. 5, wireless LAN base station 104 includes an authentication device 31 to perform authentication using inputted information. In authentication device 31, the above-described authentication is performed.

Charging ECU 201a includes a recognizing device 41, a decryption device 42, an authentication information setting device 43, and a timing device 44.

Recognizing device 41 is configured to recognize authentication information (in the present embodiment, an SSID and an encryption key) included in the information acquired by an imaging device (in the present embodiment, back camera 203 or front camera 204). In the present embodiment, if vehicle 2 shown in FIG. 1 parks backward in a parking section (any one of parking sections A to C) in charging station 1, the information (in particular, the data of image that has been taken) including the authentication information indicated on information indicator 3 is acquired by back camera 203. If vehicle 2 parks forward in a parking section in charging station 1, the information (in particular, the data of image that has been taken) including the authentication information indicated on information indicator 3 is acquired by front camera 204.

Decryption device 42 is configured to decrypt encrypted authentication information using a key inputted beforehand. If a key has not been inputted to decryption device 42 beforehand, decryption device 42 requests the user to input a key. The key for decrypting encrypted authentication information may be hereinafter referred to as a "decryption key". The user (e.g. the driver of vehicle 2) can input a decryption key to decryption device 42 via input device 201c. The decryption key inputted to decryption device 42 is stored in the storage device of charging ECU 201a.

For example, the decryption key is given from the administrator of charging station 1 only to a prescribed user (in particular, a user permitted to use the service). The administrator of charging station 1 may give the decryption key only to the user with whom a contract for use of the service has been held, or only to the user who has paid for the service.

In the present embodiment, if recognizing device 41 determines that authentication information is included in the information acquired by an imaging device (i.e., if the authentication information is recognized), whether or not the authentication information is encrypted is determined. If the authentication information is unencrypted, recognizing device 41 sends the acquired authentication information to communication device 201b without any change.

If the authentication information is encrypted, recognizing device 41 instructs decryption device 42 to decrypt the authentication information. When receiving the decryption instruction from recognizing device 41, decryption device 42 determines whether or not a decryption key has been inputted beforehand (i.e., whether or not a decryption key is stored in the storage device of charging ECU 201a). If a decryption key has been inputted to decryption device 42 beforehand, decryption device 42 decrypts the authentication information using the decryption key. On the other hand, if a decryption key has not been inputted to decryption device 42 beforehand, decryption device 42 requests the user to input a decryption key, and decrypts the authentication information using the decryption key inputted by the user. The authentication information decrypted by decryption device 42 is sent from decryption device 42 to recognizing device 41 and is then sent from recognizing device 41 to communication device 201b.

When recognizing device 41 outputs the authentication information to communication device 201b, recognizing device 41 sends a signal to that effect (hereinafter referred to as an "input completion signal") to authentication information setting device 43. By the presence or absence of the input completion signal, authentication information setting device 43 can determine whether or not the authentication information has been inputted from recognizing device 41 to communication device 201b.

If the input completion signal has not been inputted from recognizing device 41 and a prescribed condition is satisfied, then authentication information setting device 43 requests the user to input authentication information.

In the present embodiment, while recognizing device 41 determines that authentication information is not included in the information acquired by an imaging device (i.e., while authentication information is not recognized by recognizing device 41), the input completion signal is not inputted from recognizing device 41 to authentication information setting device 43. In such a situation, authentication information setting device 43 determines whether or not a prescribed condition (hereinafter referred to as a "manual input condition") is satisfied. If the manual input condition is satisfied, authentication information setting device 43 requests the user to input authentication information. The manual input condition is satisfied when a manual input mode, which is described later, is selected by the user. The manual input condition is also satisfied when timing device 44 determines that a time-out has occurred.

In the present embodiment, any one of the automatic input mode and the manual input mode can be select by the user's operation of input device 201c. For example, a flag (hereinafter referred to as an "input mode flag") representing which of the automatic input mode and the manual input mode is selected is stored in the storage device of charging ECU 201a.

In a situation in which the automatic input mode is selected (e.g. input mode flag=1), authentication information setting device 43 monitors the value of the input mode flag. If the manual input mode is selected (e.g. if the value of the input mode flag changes from 1 to 0), authentication information setting device 43 requests the user to input authentication information.

In a situation in which the automatic input mode is selected, timing device 44 determines whether or not prescribed time has elapsed (i.e., whether or not a time-out has occurred) from a prescribed timing (e.g. the timing of the start of determination as to whether or not the authentication information is included in the information acquired by an imaging device). If a time-out has occurred, the mode is switched from the automatic input mode to the manual input mode. Occurrence of the time-out causes the mode to be switched from the automatic input mode to the manual input mode, and causes authentication information setting device 43 to request the user to input authentication information. At least one of the on/off of the time-out and the time left before the time-out may be settable by the user as desired.

If it is determined that the manual input condition is satisfied as described above, authentication information setting device 43 requests the user to input authentication information via, for example, display device 201d. The user who has received this request can input authentication information to authentication information setting device 43 via input device 201c. If authentication information is inputted to authentication information setting device 43 by the user, authentication information setting device 43 sends the authentication information to communication device 201b.

Communication device 201b receives the authentication information usable for authentication at authentication device 31. Specifically, unencrypted authentication information (in particular, authentication information acquired by an imaging device, or authentication information inputted by the user), or authentication information decrypted after being acquired (in particular, authentication information decrypted by decryption device 42) is sent from recognizing device 41 or authentication information setting device 43 to communication device 201b. Communication device 201b sends the received authentication information to wireless LAN base station 104. The information sent from communication device 201b to wireless LAN base station 104 is inputted to authentication device 31.

Authentication device 31 performs authentication using the authentication information received from communication device 201b. If authentication information registered in authentication device 31 (in particular, an SSID and an encryption key indicated on information indicator 3) matches with the authentication information received from communication device 201b, authentication device 31 determines that the authentication has succeeded. If the authentication has succeeded, authentication device 31 permits vehicle 2 to use wireless LAN 301 (and thus, wireless communication using wireless LAN 301). This allows wireless communication between communication device 101b and communication device 201b. On the other hand, if the authentication has failed, authentication device 31 does not permit vehicle 2 to use wireless LAN 301. In this case, communication device 201b cannot use wireless LAN 301. Communication device 201b cannot perform wireless communication with communication device 101b until authentication device 31 permits use of wireless LAN 301.

Next, an example of procedure for charging power storage device 202 of vehicle 2 in charging station 1 is described with reference to FIG. 1, FIG. 2, and FIG. 4.

With reference to FIG. 1, control unit 101 determines whether or not any of parking sections A to C is vacant, based on the outputs from vehicle detection sensors 103A to 103C. If there is no other vehicle (a vehicle other than vehicle 2) in at least one of parking sections A to C, it is determined that any of parking sections A to C is vacant. Then, a signal (hereinafter referred to as a "broadcast signal") notifying availability of charging station 1 (in particular, at least one of power transmission units 10A to 10C) is broadcast from control unit 101 to the surroundings. The broadcasting refers to sending information to many and unspecified objects simultaneously. The broadcast signal is sent to the surroundings of charging station 1 (e.g. a range of 5 to 10 m around control unit 101). On the other hand, if it is determined that there are other vehicles in all of parking sections A to C, control unit 101 does not send the above-described broadcast signal to the surroundings.

With reference to FIG. 4 along with FIG. 1, when charging ECU 201a of vehicle 2 receives the above-described broadcast signal via communication device 201b, charging ECU 201a makes display device 201d display information to the effect that charging station 1 is available. The display notifies the driver of vehicle 2 that any of parking sections A to C is vacant, and the driver can park vehicle 2 in any of parking sections A to C that is vacant (hereinafter referred to as a "vacant section"). For example, as shown in FIG. 1, vehicle 2 enters and parks in parking section A (vacant section) backward from the arrow F side. With vehicle 2 parked in parking space S of parking section A, power storage device 202 (onboard battery) can be charged by power transmission unit 10A. However, if the driver has failed to park vehicle 2 in parking space S, vehicle 2 can be moved into parking space S by alignment described later.

Images of the backward field of vehicle 2 are successively taken by back camera 203 during the above-described parking motion and are stored in the storage device of charging ECU 201a. Information indicator 3, which is installed in parking space S (in particular, at power transmission unit 10A), appears in the images taken during the parking motion of vehicle 2. That is, information indicator 3 (and thus, the authentication information indicated on information indicator 3) is included in the images successively taken from when vehicle 2 receives the above-described broadcast signal to when vehicle 2 parks in parking section A. As described above, vehicle 2 acquires authentication information by an imaging device (e.g. back camera 203) during the parking motion. The acquired authentication information is stored in the storage device of charging ECU 201a. In the case described herein, vehicle 2 parks backward in a vacant section. However, vehicle 2 may park forward in a vacant section. If vehicle 2 parks forward, front camera 204 successively takes images of the frontward field of vehicle 2 so that the above-described authentication information is acquired.

Vehicle 2 sends, to wireless LAN base station 104, the authentication information acquired as described above or information obtained by performing prescribed information processing (e.g. decryption) on the acquired authentication information. Wireless LAN base station 104 uses the information received from vehicle 2 to perform authentication as to whether to permit use of wireless LAN 301. If the authentication has succeeded, wireless LAN base station 104 permits vehicle 2 to use wireless LAN 301. The details of the process of when vehicle 2 acquires information to be used for the authentication and sends the information to wireless LAN base station 104 (e.g. the process of when vehicle 2 fails to acquire the authentication information) will be described later (see FIG. 6).

Next, alignment between power transmission unit 10A and power reception unit 20 (hereinafter also simply referred to as "alignment") is performed. The alignment includes checking whether parked vehicle 2 lies in parking space S (i.e., whether the amount of displacement of power reception unit 20 from the reference power reception position is smaller than a prescribed value), and, if parked vehicle 2 does not lie in parking space S, moving vehicle 2 into parking space S. Various methods are known as alignment methods, and any method may be employed.

Next, control unit 101 and control unit 201 perform a process (so-called "pairing") for identifying which of power transmission units 10A to 10C has been aligned with power reception unit 20. By this pairing, control unit 101 identifies the power transmission unit to be used for charging (in the example shown in FIG. 1, power transmission unit 10A), which will be described later. Wireless communication between control unit 101 and control unit 201 in the pairing is performed via wireless LAN 301. Various methods are known as pairing methods, and any method may be employed.

Next, control unit 101 performs power transfer for charging power storage device 202 of vehicle 2, using the power transmission unit identified by the pairing (in the example shown in FIG. 1, power transmission unit 10A). Power storage device 202 is charged by the wireless power transfer from power transmission unit 10A to power reception unit 20. Control unit 101 and control unit 201 control the wireless power transfer between power transmission unit 10A and power reception unit 20 while exchanging information with each other. The exchange of information between control unit 101 and control unit 201 in the control of the wireless power transfer is performed via wireless communication using wireless LAN 301. Various methods are known as control methods for the wireless power transfer, and any method may be employed.

Figure 6:
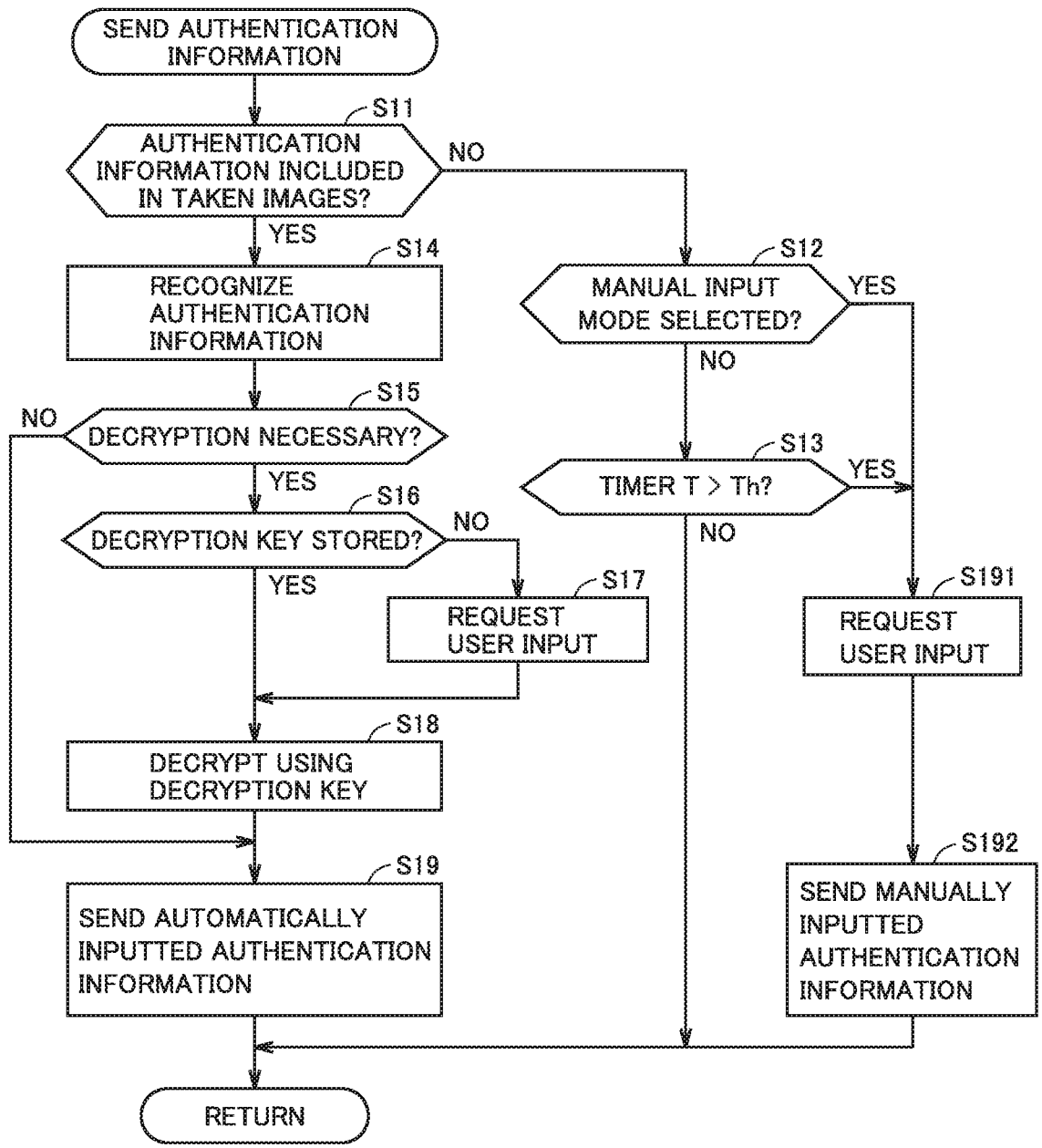
FIG. 6 is a flowchart showing an authentication method for a vehicle charging system in an embodiment of the present disclosure.

FIG. 6 is a flowchart showing an authentication method for a vehicle charging system in the present embodiment. For example, in a situation in which the automatic input mode is selected, in response to charging ECU 201a receiving the above-described broadcast signal (the signal that notifies availability of charging station 1), the process of FIG. 6 starts and repeats until the authentication information is sent from communication device 201b to wireless LAN base station 104 at step S19 or S192. The timing at which the process of FIG. 6 starts is hereinafter referred to as "process start timing".

The storage device of charging ECU 201a stores a timer T indicating the elapsed time from the process start timing. Timer T starts at the same time as the start of the process of FIG. 6.

The process start timing is not limited to the timing at which charging ECU 201a received the broadcast signal, but may be changed as desired. For example, the process start timing may be the timing at which vehicle 2 reached charging station 1. Whether or not vehicle 2 has reached charging station 1 can be detected based on the signals from global positioning system (GPS) satellites acquired by an onboard car navigation system, for example.

With reference to FIG. 6 along with FIG. 5, during a parking motion into a vacant section, images of the backward field or the frontward field of vehicle 2 are successively taken by an imaging device and are stored in the storage device of charging ECU 201*a*. If vehicle 2 parks backward in the vacant section, the imaging device is back camera 203; whereas if vehicle 2 parks forward in the vacant section, the imaging device is front camera 204.

At step S11, recognizing device 41 checks the images in the above-described storage device, and determines whether or not authentication information (in particular, an SSID and an encryption key indicated on information indicator 3) is included in the information acquired by an imaging device (in particular, the images that has been taken). Specifically, recognizing device 41 determines whether or not authentication information indicated in a prescribed form (e.g. QR Code [registered trademark]) is included in the images. The determination can be performed using a known image recognition technique.

During a period (hereinafter referred to as a "search period") from the start of a parking motion of vehicle 2 into a vacant section to imaging of authentication information by an imaging device, it is determined that authentication information is not included in the information acquired by an imaging device (NO at step S11), and the process goes on to step S12.

If some abnormality occurs and an imaging device cannot acquire authentication information during a parking motion (hereinafter referred to as an "abnormal state"), step S11 keeps on being determined to be NO. In this case, therefore, the process also goes on to step S12.

At step S12, authentication information setting device 43 determines whether or not the manual input mode has been selected by the user. If the automatic input mode is maintained during the search period, then step S12 is determined to be NO, and the process goes on to step S13.

At step S13, timing device 44 determines whether or not timer T has exceeded a prescribed threshold Th (hereinafter also simply referred to as "Th") (timer T>Th) Th is a threshold used to determine whether or not the above-described abnormal state has occurred. For example, Th is a value obtained beforehand by experiments, for example. Th is set to a period of time longer than an average search period in a normal state. Th is preferably set to a sufficiently long period of time in view of, for example, the difference in driving skills depending on the user. Th may be a fixed value or may be variable depending on, for example, the situation of vehicle 2.

While steps S12 and S13 are both determined to be NO, the process of step S11 is repeated. On the other hand, if any of steps S12 and S13 is determined to be YES, the process goes on to step S191. For example, if the manual input mode is selected by the user during the search period, step S12 is determined to be YES. If the abnormal state has occurred due to some abnormality and prescribed time (in particular, the time defined by threshold Th) has elapsed from the process start timing, then step S13 is determined to be YES.

At step S191, authentication information setting device 43 requests the user to input authentication information and waits until an input is provided by the user. Authentication information setting device 43 can request the user to input authentication information by displaying prescribed information (e.g. a message and an input screen) on display device 201*d*. The request to the user may be performed through voice. The user who has received the request can input authentication information to authentication information setting device 43 via input device 201*c*. If an input from the user is not provided after a lapse of prescribed time from the start of the process of step S191, the process of FIG. 6 may be canceled due to time-out.

When authentication information is inputted to authentication information setting device 43 by the user (i.e., manually inputted), the manually inputted authentication information is sent from authentication information setting device 43 to communication device 201*b* and is further sent from communication device 201*b* to authentication device 31 of wireless LAN base station 104 (step S192). By this sending process, authentication information is inputted to authentication device 31, and the process of FIG. 6 ends.

If it is determined that authentication information is included in the information acquired by an imaging device at step S11 (YES at step S11), then recognizing device 41 recognizes the authentication information at step S14, and the recognized authentication information is saved in the storage device of charging ECU 201*a*.

Then, recognizing device 41 determines whether or not decryption is necessary for the recognized authentication information (step S15). If the authentication information is usable for authentication in authentication device 31, it is determined that decryption is not necessary. On the other hand, if the authentication information is not usable for authentication in authentication device 31, it is determined that decryption is necessary. Specifically, if the authentication information is encrypted, it is determined that decryption is necessary (YES at step S15); whereas if the authentication information is unencrypted, it is determined that decryption is not necessary (NO at step S15).

If it is determined that decryption is necessary at step S15, then recognizing device 41 instructs decryption device 42 to decrypt the authentication information, and decryption device 42 that has received the instruction determines whether or not a decryption key for the authentication information has been inputted beforehand (i.e., whether or not a decryption key for the authentication information is stored in the storage device of charging ECU 201*a*) (step S16). For example, if the storage device of charging ECU 201*a* holds a plurality of different decryption keys for different pieces of authentication information, decryption device 42 tries to decrypt the authentication information using the decryption keys one after another. If the authentication information is decrypted by any of the decryption keys, it may be determined that a decryption key for the authentication information has been inputted beforehand; whereas if the authentication information cannot be decrypted by any of the decryption keys, it may be determined that a decryption key for the authentication information has not been inputted beforehand.

If a decryption key for the authentication information has not been inputted to decryption device 42 beforehand (NO at step S16), decryption device 42 requests the user to input a decryption key and waits until an input is provided by the user (step S17). Decryption device 42 can request the user to input a decryption key by displaying prescribed information (e.g. a message and an input screen) on display device 201*d*. The request to the user may be performed through voice. The user who has received the request can input a decryption key to decryption device 42 via input device 201*c*. When a decryption key is inputted to decryption device 42 by the user, decryption device 42 saves the decryption key in the storage device of charging ECU 201*a*. Accordingly, step S16 will be determined to be YES from the next charging, thus saving the user the trouble of inputting a decryption key. If an input from the user is not provided after a lapse of prescribed time from the start of the process of step S17, the process of FIG. 6 may be canceled due to time-out.

If a decryption key for the authentication information has been inputted to decryption device 42 beforehand (YES at step S16) or if a decryption key is inputted at step S17, then the process goes on to step S18. At step S18, decryption device 42 decrypts encrypted authentication information using the decryption key, and sends the decrypted authentication information to recognizing device 41. If a decryption key has been inputted to decryption device 42 beforehand, decryption device 42 decrypts, at step S18, authentication information using the decryption key inputted beforehand. If a decryption key has not been inputted to decryption device 42 beforehand, decryption device 42 decrypts, at step S18, authentication information using a decryption key inputted by the user at step S17.

If authentication information is unencrypted (NO at step S15) or if authentication information is decrypted at step S18, then the process goes on to step S19. By the processes of steps S14 and S18, authentication information is inputted to recognizing device 41 without user operation (i.e., automatically inputted). At step S19, the automatically inputted authentication information (unencrypted authentication information or authentication information decrypted after being acquired) is sent from recognizing device 41 to communication device 201*b* and is further sent from communication device 201*b* to authentication device 31 of wireless LAN base station 104. By this sending process, authentication information is inputted to authentication device 31, and the process of FIG. 6 ends.

The steps shown in FIG. 6 are executed by charging ECU 201*a* as a computer. The authentication information to be used for authentication is acquired by an imaging device (back camera 203 or front camera 204) of vehicle 2 (step S14), and the acquired authentication information is sent to authentication device 31 of charging station 1 by communication device 201*b* of vehicle 2 (step S19). If authentication information is successfully acquired by an imaging device of vehicle 2 (YES at step S11), the authentication information is automatically sent to authentication device 31 without requiring the user to input the authentication information.

In the process of FIG. 6 described above, if authentication information acquired by an imaging device is not encrypted and is thus usable for authentication without any change (NO at step S15), recognizing device 41 outputs the authentication information acquired by the imaging device to communication device 201*b* without any change, with no information processing performed (step S19). On the other hand, if the authentication information acquired by the imaging device is encrypted (YES at step S15), recognizing device 41 instructs decryption device 42 to decrypt the authentication information (step S18). The authentication information decrypted and thus usable for authentication is outputted from recognizing device 41 to communication device 201*b* (step S19).

By the above-described process, the authentication information usable for authentication is sent from recognizing device 41 to communication device 201*b*. Then, this authentication information is sent from communication device 201*b* to authentication device 31. Authentication device 31 performs authentication using the authentication information received from communication device 201*b* If the information received from communication device 201*b* matches an SSID and an encryption key indicated on information indicator 3, authentication device 31 determines that the authentication has succeeded. If the authentication has succeeded, authentication device 31 permits vehicle 2 to use wireless LAN 301 (and thus, wireless communication using wireless LAN 301). This allows wireless communication between communication device 101*b* and communication device 201*b*, thus allowing the above-described alignment, pairing, and control of wireless power transfer for charging power storage device 202.

According to the process of FIG. 6 described above, the user does not have to input authentication information every time authentication is necessary. Thus, the user's work load for authentication (in particular, the user's trouble of inputting authentication information) can be reduced, and user convenience can be improved.

In the above-described embodiment, charging ECU 201*a* includes decryption device 42 to decrypt encrypted authentication information using a decryption key inputted beforehand. Thus, once a decryption key is inputted to decryption device 42, step S16 is determined to be YES afterward. That is, when decryption of authentication information is necessary (YES at step S15), the authentication information is automatically decrypted without requiring the user to input the decryption key (step S18). Thus, the user does not have to input the decryption key every time decryption of authentication information is necessary.

In the vehicle charging system in the above-described embodiment, decryption device 42 is provided assuming that charging is performed both in charging equipment using unencrypted authentication information and in charging equipment using encrypted authentication information. This is, however, not a limitation. If charging is performed only in charging equipment using unencrypted authentication information, decryption device 42 may be omitted.

In the process of FIG. 6 described above, if it is determined that authentication information is not included in the information acquired by an imaging device of vehicle 2 (NO at step S11), and a prescribed manual input condition is satisfied (YES at any of steps S12 and S13), the user is requested to input authentication information (step S191). Thus, if the abnormal state has occurred, authentication information inputted (manually inputted) by the user can be sent to authentication device 31, so that authentication device 31 can perform authentication.

In the process of FIG. 6 described above, the manual input condition is satisfied if any of steps S12 and S13 is determined to be YES. That is, the requirement of each of steps S12 and S13 is a sufficient requirement (sufficient condition) for the satisfaction of the manual input condition. However, this is not a limitation, and the manual input condition may be changed as desired. For example, only one of the requirements of steps S12 and S13 may be the sufficient condition for the satisfaction of the manual input condition.

Figure 7:
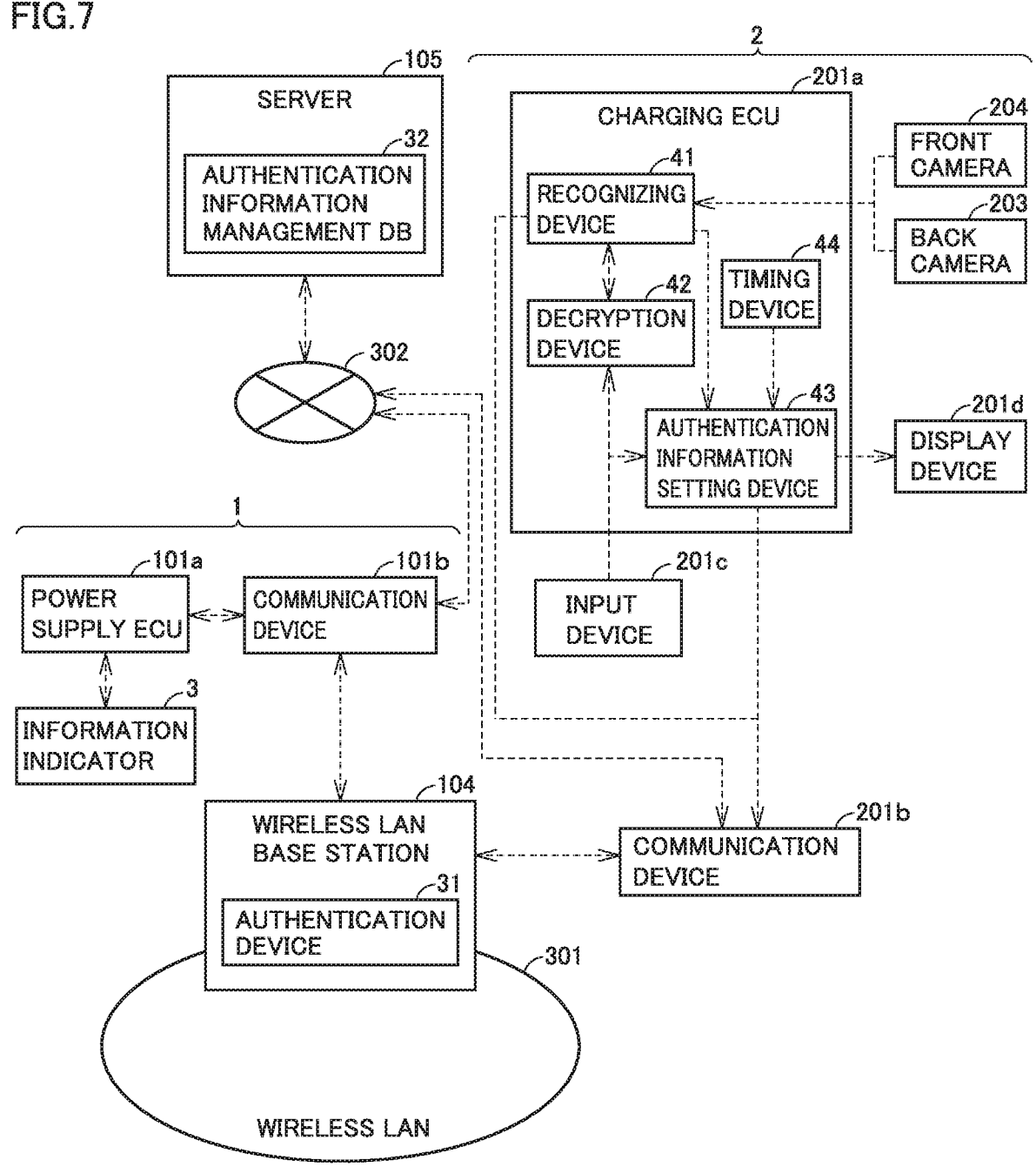
FIG. 7 shows a configuration for changing authentication information in the vehicle charging system.

At least one of the content and encryption scheme of authentication information may be variable at a desired time in order to enhance the security level. FIG. 7 shows a configuration of a vehicle charging system for changing authentication information.

With reference to FIG. 7, the vehicle charging system includes a server 105 having an authentication information management DB 32. Authentication information management DB 32 is stored in a storage device of server 105. Authentication information management DB 32 manages the authentication information and its decryption key for each charging equipment in association with an ID (identifier) to identify each charging equipment. Authentication information management DB 32 manages the address (e.g. IP address) of each charging equipment, and also manages the registered user and the address thereof (e.g. IP address) for each charging equipment.

Each of communication devices 101b and 201b is configured to be connected to a network 302. Network 302 is, for example, the Internet.

In the example of FIG. 7, information indicator 3 comprises a display device (e.g. an FPD). Information indicator 3 is configured to change the display contents in accordance with the instructions from power supply ECU 101a.

Server 105 regularly changes the authentication information of each charging equipment and its decryption key. For example, server 105 changes the authentication information and the decryption key of charging station 1 managed in authentication information management DB 32. Server 105 sends the changed authentication information to the address of communication device 101b. Power supply ECU 101a receives the changed authentication information sent from server 105 via communication device 101b and saves it in the storage device. Then, power supply ECU 101a makes information indicator 3 display the changed authentication information received from server 105.

Further, server 105 sends a changed decryption key to the address of the user registered for charging station 1 (e.g. the address of communication device 201b). Charging ECU 201a receives the changed decryption key sent from server 105 via communication device 201b and saves it in the storage device. As a result, step S16 in FIG. 6 is determined to be YES, and decryption of authentication information is performed using the changed decryption key at step S18. The update of the decryption key in the storage device of charging ECU 201a is automatically performed without user operation. The decryption key in the storage device of charging ECU 201a may be managed separately for each charging equipment or for each authentication information.

In the above-described embodiment, back camera 203 and front camera 204 are used as imaging devices (onboard cameras) of vehicle 2. However, this is not a limitation. An imaging device may be provided on only one of the back face and the front face of the vehicle, or an imaging device may be provided on a side face and/or the bottom face of the vehicle. In some cases, for example, an imaging device is provided on the power reception device of the vehicle for foreign body detection or alignment. Such an imaging device may be used to acquire authentication information.

In the above-described embodiment, information indicator 3 is provided inside of parking space S (in particular, at power transmission unit 10A). The position of information indicator 3, however, is not limited to this but may be changed as desired. For example, information indicator 3 may be provided around parking space S additionally or alternatively to inside of parking space S.

Figure 8:
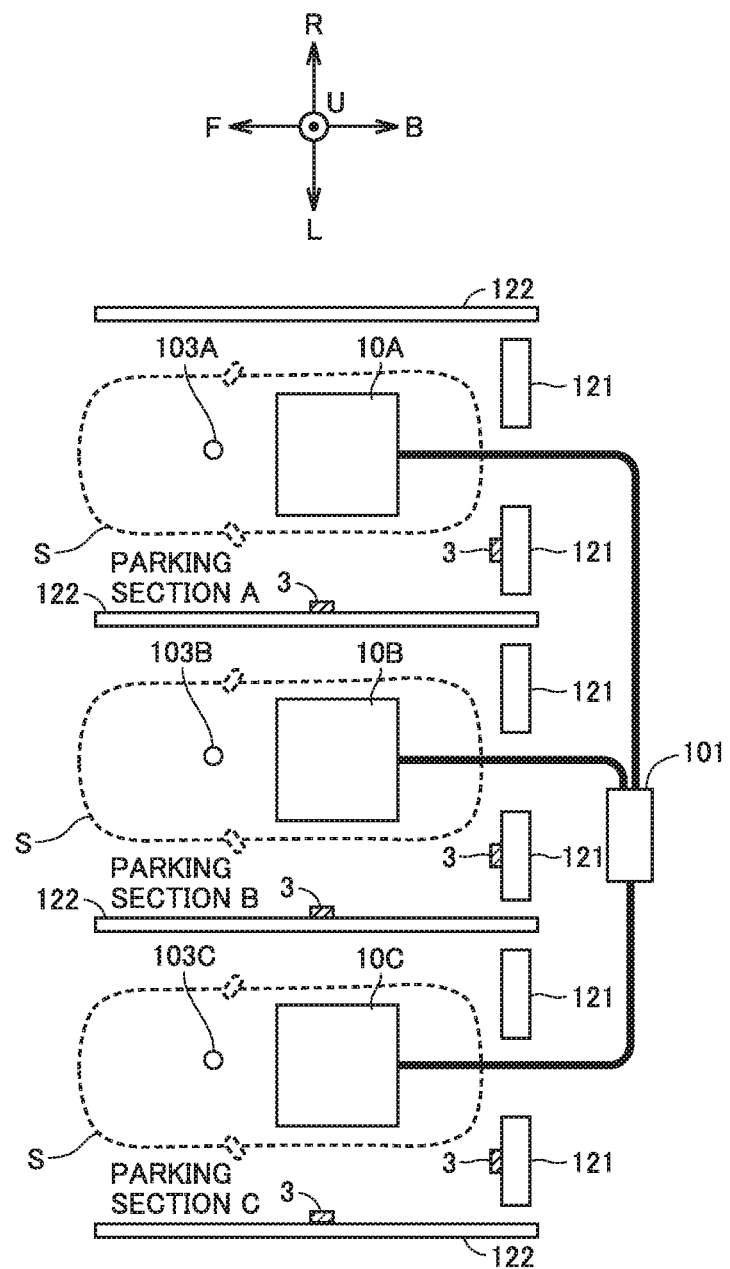
FIG. 8 shows a variation of the position of the information indicator

FIG. 8 shows a variation of the position of information indicator 3. With reference to FIG. 8, information indicator 3 may be provided around parking space S. Information indicators 3 may be provided on members 121 and 122 for partitioning parking sections A to C, for example. Member 121 defines the end (the arrow B side in FIG. 8) opposite to the entrance side (the arrow F side in FIG. 8) in the front-back direction of a parking section. Member 122 defines the end in the right-left direction (R-L direction) of a parking section, and divides adjacent parking sections. Each of members 121 and 122 may be a stopper block. Each of members 121 and 122 may be independently in the shape of a rectangular parallelepiped or other shapes (such as a pillared shape or a plate-like shape). At least one of members 121 and 122 may be omitted, and a parking section may be defined by drawing a line on the ground to indicate the contour of the parking section (or the boundary between parking sections).

In order for vehicle 2 to smoothly acquire authentication information, it is preferable that an imaging device of vehicle 2 acquire authentication information by the time vehicle 2 reaches a parking section (e.g. any of parking sections A to C shown in FIG. 1) in charging station 1, or it is preferable that an imaging device of vehicle 2 acquire authentication information while vehicle 2 is parked in a parking section in charging station 1. For example, information indicator 3 may be provided on the way from the entrance of charging station 1 to a parking section, or may be provided around a parking section (e.g. within a range where an imaging device of vehicle 2 parked in the parking section can recognize information indicator 3). Information indicator 3 may be provided on control unit 101, for example. A member (e.g. signboard) having information indicator 3 thereon may be provided at a desired position.

The authentication information may be indicated by light. In some cases, a luminous body (e.g., an LED) is provided on the power transmission device of charging equipment for foreign body detection or alignment, for example. The information indicator may be formed by such a luminous body. In the vehicle charging system, the information indicator (luminous body) may indicate an optical signal (e.g. a blinking pulse signal) as the authentication information. An imaging device of the vehicle may acquire such an optical signal.

The authentication information is not limited to the SSID and the encryption key. Any information can be employed that can be used for authentication as to whether to permit use of a prescribed service (in the above-described embodiment, wireless LAN 301 provided by charging station 1).

The prescribed service permitted to be used by successful authentication is not limited to a network (e.g. wireless LAN) provided by the charging equipment. For example, use of a billing system provided by the charging equipment and related to the fee for the charging equipment may be permitted by successful authentication as described above. The billing system provides information on use of the charging equipment and collects the fee for the charging equipment. A user who has succeeded in authentication can input a user ID (an identifier to identify the user) to the billing system and thus can automatically make a payment for usage fee (e.g. a payment by bank account or credit card registered in association with the user ID beforehand), and can check the status of use of the charging equipment and the solvency (e.g. the balance of a bank account registered in association with the user ID beforehand) for each user. In order to eliminate the need for input of the user ID, the user ID may be sent from the sending device of the vehicle to the authentication device of the charging equipment along with authentication information when use of the service is authenticated.

The power feeding system from the charging equipment to the vehicle is not limited to the wireless power feeding system but may be any system. For example, a system in which electric power is supplied from the charging equipment to the vehicle via a cable (contact power feeding system) may be employed.

Although an embodiment of the present disclosure has been described, it should be understood that the embodiment disclosed herein is by way of illustration and example only in every respect, and is not to be taken by way of limitation. The scope of the present disclosure is defined by the terms of the appended claims and is intended to include any modification within the scope and meaning equivalent to the terms of the claims.

What is claimed is:

1. A vehicle charging system comprising:
a vehicle; and
charging equipment configured to perform supply of electric power from the charging equipment to the vehicle,
the charging equipment comprising:
an information indicator configured to indicate authentication information; and
an authentication device configured to perform authentication using the authentication information;
the vehicle comprising:
an imaging device; and
a sending device configured to send the authentication information acquired by the imaging device to the authentication device,
the authentication device being configured to perform the authentication using the authentication information received from the sending device, and configured to, if the authentication has succeeded, permit the vehicle to use a prescribed service,
wherein the supply of electric power from the charging equipment to the vehicle is performed when the vehicle is parked in a prescribed region of the charging equipment,
the information indicator is provided in the prescribed region,
the imaging device includes a camera,
the camera is provided on a front face, a back face, a side face, or a bottom face of the vehicle, and
the camera is configured to acquire the authentication information when the vehicle parks in the prescribed region.

2. The vehicle charging system according to claim 1, wherein
the charging equipment includes
a first communication device configured to perform wireless communication, and
a power transmission device configured to wirelessly supply electric power, the vehicle includes
a second communication device configured to perform wireless communication, and
a power reception device configured to wirelessly receive electric power, and
in response to the authentication succeeding, wireless communication between the first communication device and the second communication device is permitted as the prescribed service.

3. The vehicle charging system according to claim 2, wherein the information indicator is provided at the power transmission device.

4. The vehicle charging system according to claim 2, wherein
the wireless communication to be permitted is wireless communication using a wireless LAN,
the authentication information includes an SSID and an encryption key for connection to the wireless LAN, and
the authentication information is indicated in a form of a two-dimensional code.

5. The vehicle charging system according to claim 2, wherein the power reception device is provided on the bottom face of the vehicle, the camera being provided on the power reception device for foreign body detection or alignment.

6. The vehicle charging system according to claim 1, wherein the imaging device is configured to be usable for drive assist of the vehicle.

7. The vehicle charging system according to claim 1, wherein the vehicle further includes a decryption device configured to decrypt the authentication information using a key inputted beforehand when the authentication information is encrypted.

8. A vehicle charging system comprising:
a vehicle; and
charging equipment configured to supply electric power from the charging equipment to the vehicle,
the charging equipment comprising:
an information indicator configured to indicate authentication information; and
an authentication device configured to perform authentication using the authentication information;
the vehicle comprising:
an imaging device; and
a sending device configured to send the authentication information acquired by the imaging device to the authentication device,
the authentication device being configured to perform the authentication using the authentication information received from the sending device, and configured to, if the authentication has succeeded, permit the vehicle to use a prescribed service,
the supply of electric power from the charging equipment to the vehicle being performed when the vehicle is parked in a prescribed region of the charging equipment,
the information indicator being provided in the prescribed region,
the imaging device including a front camera configured to image a frontward field of the vehicle, and a back camera configured to image a backward field of the vehicle, and
the front camera being configured to acquire the authentication information when the vehicle parks forward in the prescribed region; and the back camera being configured to acquire the authentication information when the vehicle parks backward in the prescribed region.

* * * * *